United States Patent [19]

George

[11] Patent Number: 5,532,558
[45] Date of Patent: Jul. 2, 1996

[54] PROTECTION CIRCUIT FOR DYNAMIC FOCUS AMPLIFIER

[75] Inventor: John B. George, Carmel, Ind.

[73] Assignee: Thomson Consumer Electronics, Inc., Indianapolis, Ind.

[21] Appl. No.: 413,046

[22] Filed: Mar. 29, 1995

Related U.S. Application Data

[63] Continuation of Ser. No. 285,580, Aug. 3, 1994, abandoned.

[51] Int. Cl.$^6$ ..................................................... H01J 29/58
[52] U.S. Cl. ............................................................ 315/382.1
[58] Field of Search ................................. 315/382, 382.1; 330/207 P

[56] References Cited

U.S. PATENT DOCUMENTS

| | | | |
|---|---|---|---|
| 3,663,860 | 5/1972 | Phillips | 315/200 |
| 3,868,580 | 2/1975 | Battjes | 330/18 |
| 4,689,711 | 8/1987 | Conzelmann et al. | 361/91 |
| 4,990,832 | 2/1991 | Maninger et al. | 315/382.1 |

*Primary Examiner*—Theodore M. Blum
*Attorney, Agent, or Firm*—Joseph S. Tripoli; Joseph J. Laks; Harvey D. Fried

[57] ABSTRACT

An active pull up arrangement coupled to a high voltage source generates an operating voltage. An amplifier for a dynamic focus modulating signal is energized by the operating voltage and has a plurality of transistors, for example low voltage transistors, coupled as Darlington pairs in a differential configuration. One of the low voltage transistors is coupled in series between a resistor in the pull up arrangement and a return supply, for example ground, in a push pull configuration. A fault condition in the push pull configuration can destroy the resistor and cause an open circuit condition. A switch, for example a diode or a Zener diode, is coupled between the one transistor of the amplifier and the supply return. The switch prevents reverse breakdown of the transistors in the event of the fault condition, until the resistor is destroyed. The resistor may be a fusible resistor.

17 Claims, 3 Drawing Sheets

PROTECTION CIRCUIT FOR DYNAMIC FOCUS AMPLIFIER

CROSS REFERENCE TO RELATED APPLICATIONS

This is a continuation of application Ser. No. 08/285,580, filed Aug. 3, 1994, and now abandoned.

BACKGROUND OF THE INVENTION

This invention relates to protection circuits in modulated focus voltage amplifiers for television apparatus.

The scanning distance of cathode ray tubes from the center of deflection to the scanned raster is not uniform. The scanning distance varies markedly as the beam is deflected horizontally and vertically from the central portion of the screen, and consequently, defocusing is most severe at the corners of the raster. The adoption of picture tubes of increased size and wider deflection angles in recent years has emphasized the defocusing effect at the corners of the scanning pattern.

Efforts have been made to control focus in electrostatically focused tubes by changing the magnitude of the focus potential with displacement of the beam from the center of the raster, that is, by dynamic focusing. A unidirectional potential to the focus electrode of the electrostatically focused cathode ray tube establishes the proper focus condition at the center of the raster and the concurrent application of a suitable varying potential maintains that condition throughout the scanning raster.

In a dynamic focus circuit for a CRT system having electrostatic focus, it can be necessary to apply to the focus electrode about 800 volts p—p parabolic correction at a horizontal rate and about 200 volts p—p parabolic correction at a vertical rate. The horizontal rate correction is typically developed across the secondary of a step up transformer terminated in a capacitor. The vertical rate correction is added in series with the horizontal correction, typically by means of an amplifier that operates, for example, from a +250 volt power supply. In order to achieve a symmetrical response with minimum bias power, a class A B amplifier can be used that employs a low impedance pull-up to charge the load capacitor. This type of push pull amplifier is subject to catastrophic failure if both devices turn on at the same time, such that a direct short occurs between the +250 volt supply and ground.

The problem can be addressed by providing an R-C decoupling stage between the amplifier and the +250 volt source, such that there is minimum DC voltage drop during normal operation and a large protecting drop during a failure. The short term transients are bypassed via the filter capacitor. The capacitor needed for such a decoupling stage is large, for example 0.33 µf rated at 300 volts, and expensive. The series resistor of the R-C filter stage also causes a problem. The series resistor introduces a voltage loss in normal operation on the order of 20 volts, that limits the swing of the amplifier output.

SUMMARY OF THE INVENTION

An inventive arrangement allows the amplifier to operate with an output voltage swing almost equal to the supply voltage. When a fault is present, the sensitive low voltage devices are protected with a voltage limiting Zener diode until a fusing resistor opens.

An apparatus in accordance with an inventive arrangement comprises: means for generating a dynamic focus modulating signal for an electrode of a cathode ray tube; an active pull up arrangement generating an operating voltage; a voltage supply return; an amplifier for the modulating signal, having a plurality of transistors coupled in a push pull configuration between the pull up arrangement and the supply return and biased by the operating voltage, the transistors being subject to damage in the event of a fault condition in the push pull configuration; at least one of the transistors being coupled in series between an element of the pull up arrangement and the supply return; and, switch means coupled between the at least one transistor and the supply return for switching current flow therebetween as a function of a voltage threshold value, the switch means having a voltage threshold value below the level at which the transistors will be damaged by the fault condition.

The fault condition is a short circuit path through the pull up arrangement and the at least one transistor, between a voltage supply for the pull up arrangement and the supply return. The voltage threshold value is below the reverse breakdown levels of the transistors.

The element of the pull up arrangement comprises a fusible resistor. The switch means prevents the damage to the transistors until destruction of the fusible resistor terminates the fault condition.

The transistors may be low voltage Darlington pairs coupled in a differential configuration. The switch means may comprise a diode, for example, a Zener diode. The supply return may be ground.

An amplifier in accordance with an inventive arrangement comprises: an active pull up arrangement, including a load resistor, coupled to a voltage source and generating an operating voltage; a voltage supply return; Darlington pairs coupled in a differential push pull configuration between the operating voltage and the supply return, at least one of the Darlington pairs having a device coupled in series with the pull up arrangement; and, switch means coupled between the device and the supply return for switching current flow therebetween as a function of a voltage threshold value, the switch means having a voltage threshold value below the reverse breakdown levels of the Darlington pairs.

The switch means prevents reverse breakdown of the Darlington pairs in the event of a short circuit path through the load resistor and the device, until destruction of the resistor opens the short circuit path. The resistor may be a fusible resistor.

The switch means may comprise a diode, for example, a Zener diode. The supply return may be ground.

The amplifier may be embodied in combination with means for generating a dynamic focus modulating signal and a deflection system for a cathode ray tube.

DETAILED DESCRIPTION OF THE PREFERRED EMBODIMENTS

Figure 1:
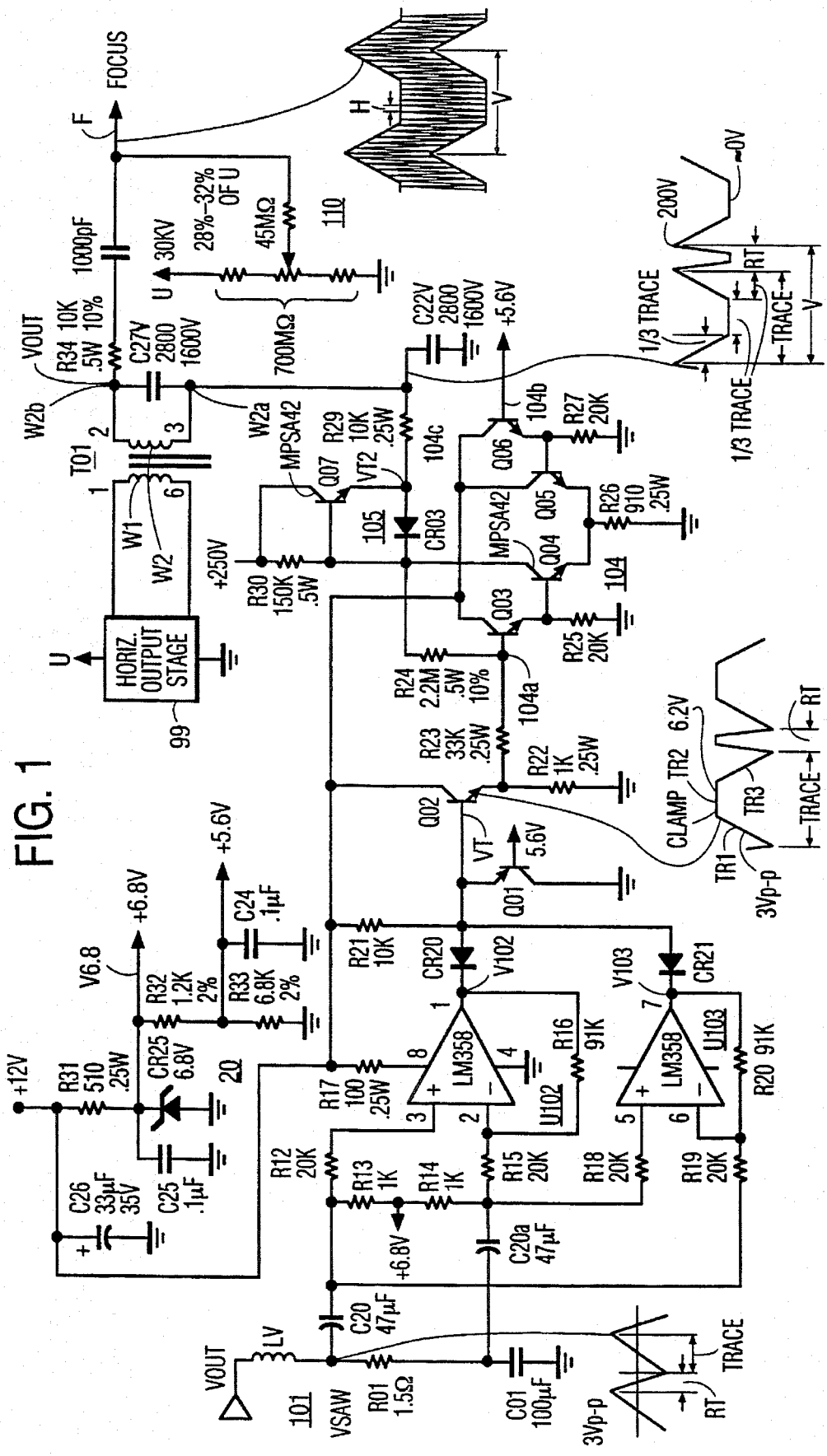
FIG. 1 is a schematic of a dynamic focus control circuit useful for understanding the environment in which inventive arrangements can be incorporated.

A dynamic focus voltage generating circuit 100 is shown in FIG. 1. A conventional vertical deflection circuit 101, not shown in detail, generates a vertical rate sawtooth VSAW in a sampling resistor R01 coupled in series with a vertical deflection winding LV. During a trace interval TRACE, signal VSAW is substantially a linear upramping voltage. During a retrace interval RT, signal VSAW is a down ramping voltage.

Signal VSAW is AC coupled to a non-inverting input terminal of an amplifier U102 operating as a non-inverting amplifier. An inverting input terminal of amplifier U102 is AC coupled via a capacitor C20a to a DC blocking capacitor C01. Capacitor C01 is coupled in series with resistor R01. A supply voltage at +6.8 volts is coupled via a resistor R13 to the non-inverting input terminal and via a resistor R14 to the inverting input terminal of amplifier U102. Such an arrangement requires only a positive supply voltage of +12 volts and no negative supply voltage for energizing amplifier U102.

Amplifier U102 produces an output signal V102 that varies in a ramping manner, during vertical trace interval TRACE. Similarly, signal VSAW is AC coupled to an amplifier U103 operating as an inverting amplifier. Amplifier U103 produces an output signal V103 that varies in a ramping manner but in an opposite direction or phase with respect to signal V102, during interval TRACE. Signals V102 and V103 are selectively coupled via diodes CR20 and CR21, respectively, operating as switches, to an emitter of a clamp transistor Q01. A clamping reference voltage equal to +5.6 volts is developed at a base of transistor Q01.

During approximately the beginning third of the length of interval TRACE, upramping signal V102 is smaller than +5.6 volts. Therefore, diode CR20 conducts and clamp transistor Q01 is non conductive. An upramping portion TR1 of a trapezoidal signal VT is developed at the emitter of transistor Q01. Following interval TR1, when signal V102 exceeds +5.6 volts, diode CR20 becomes non conductive and signal VT is clamped by transistor Q01 to a voltage equal to a clamp level VCLAMP. Clamp level VCLAMP is equal to +6.2 volts, which is the sum of +5.6 volts and the forward emitter-base voltage of transistor Q01. Transistor Q01 maintains signal VT at level CLAMP for approximately one third of the length of interval TRACE to form a portion TR2. Thereafter, during the last third of interval TRACE, down ramping signal V103 is smaller than the difference between level VCLAMP and the forward voltage of diode CR21. Consequently, diode CR21 conducts and transistor Q01 is non conductive. As a result, a down ramping portion TR3 of signal VT is produced. During vertical retrace interval RT, the waveform of signal VT has no significance due to vertical blanking. Trapezoidal signal VT is coupled via an emitter follower transistor Q02 to a resistor R23. Resistor R23 is coupled to an inverting input terminal 104a of an amplifier 104.

During ramping portions TR1 and TR3, temperature related variation of the forward voltage of diode CR20 or CR21 is compensated, and prevented from affecting the emitter voltage of transistor Q02, by the corresponding variation of the base-emitter forward voltage of transistor Q02. Similarly, during portion TR2, temperature related variation of the forward voltage of transistor Q01 is compensated by that of transistor Q02.

Amplifier 104, responsive to the temperature compensated emitter voltage of transistor Q02, is formed by a pair of transistors Q03 and Q06, each operating in an emitter follower configuration, having emitters that are coupled to the bases of a pair of transistors Q04 and Q06, respectively. Transistors Q04 and Q06 are coupled to each other as a transistor pair forming a differential amplifier. A collector of transistor Q04 is coupled to a conventional boot-strap pull-up arrangement 105. Arrangement 105 includes a collector load resistor R30 of transistor Q04 coupled to a supply voltage of +250 volts. An active pull-up transistor Q07, operating as an emitter follower when the collector voltage of transistor Q04 increases, has a base coupled to the collector of transistor Q04. A diode CR03, coupled between the emitter of transistor Q07 and the collector of transistor Q04, provides an active pull-down current path when the collector voltage of transistor Q04 decreases. A negative feedback path including resistor R24 is coupled between inverting input terminal 104a and the collector of transistor Q04.

A voltage reference, developed at a non-inverting input terminal 104b of amplifier 104, is equal to the emitter voltage of transistor Q02 when transistor Q01 performs clamping operation. Resistor R24 causes the collector voltage, and hence a voltage VT2 at an output terminal 104c of amplifier 104, to be approximately 0 volts when the emitter voltage of transistor Q02 is nominally equal to +5.6 volts, during portion TR2 of signal VT. During portion TR3 of signal VT, voltage VT2 at terminal 104c is down ramping, whereas during portion TR1, voltage VT2 is upramping. The gain of amplifier 104 is such that the peak level of trapezoidal voltage VT2 at terminal 104c is +200 volts.

The waveform of voltage VT2 is not degraded or changed when supply voltages change within a wide tolerance range, common mode cancellation. Furthermore, the same circuit can be used without modification with different vertical deflection frequencies because it is insensitive to frequency variations.

Trapezoidal voltage VT2 at the vertical rate V developed at terminal 104c is coupled to an end terminal W2a of a secondary winding W2 of a transformer T01. A horizontal rate signal produced in a conventional manner in a horizontal output stage 99 is applied to a winding W1 of transformer T01. An output signal VOUT, developed at a terminal W2b of winding W2, is equal to the sum of the vertical rate waveform at terminal W2a and a horizontal rate signal developed in winding W2. Signal VOUT is AC coupled to a focus electrode F for providing dynamic focus voltage. Signal VOUT is superimposed on a high level DC voltage produced in a voltage divider 110 from an ultor voltage U in a conventional manner.

The bias supply voltages of +6.8 volts and +5.6 volts are provided by a power supply stage 20, which receives a +12 volt input. Power supply stage 20 is regulated by a Zener diode CR25 rated at +6.8 volts, and includes capacitors C26, C25 and C24 and resistors R31, R32 and R33. Resistors R32 and R33 form a divider for setting the +5.6 volts off of the Zener regulated +6.8 volts.

All NPN transistors in FIG. 1, except Q04 and Q07, are industry type MPSA20. Transistors Q04 and Q07 are industry type MPSA42. All PNP transistors are industry type MPSA55.

In a dynamic focus circuit such as described with respect to FIG. 1, there exists a time compressed undesired copy of the desired trace waveform during vertical retrace. This waveform is shown in FIG. 1 in the "RT" interval of the waveforms at the emitter of Q02 and in the "RT" interval of the voltage across C22. This waveform is also shown at the emitter of transistor Q102 in FIG. 3. This waveform occurs during vertical blanking and therefore does not improve the focus of the picture. On the contrary, it causes an extra unneeded variation in the focus voltage than can interact with other circuits such as high voltage regulation such that undesired ringing occurs.

Figure 2:
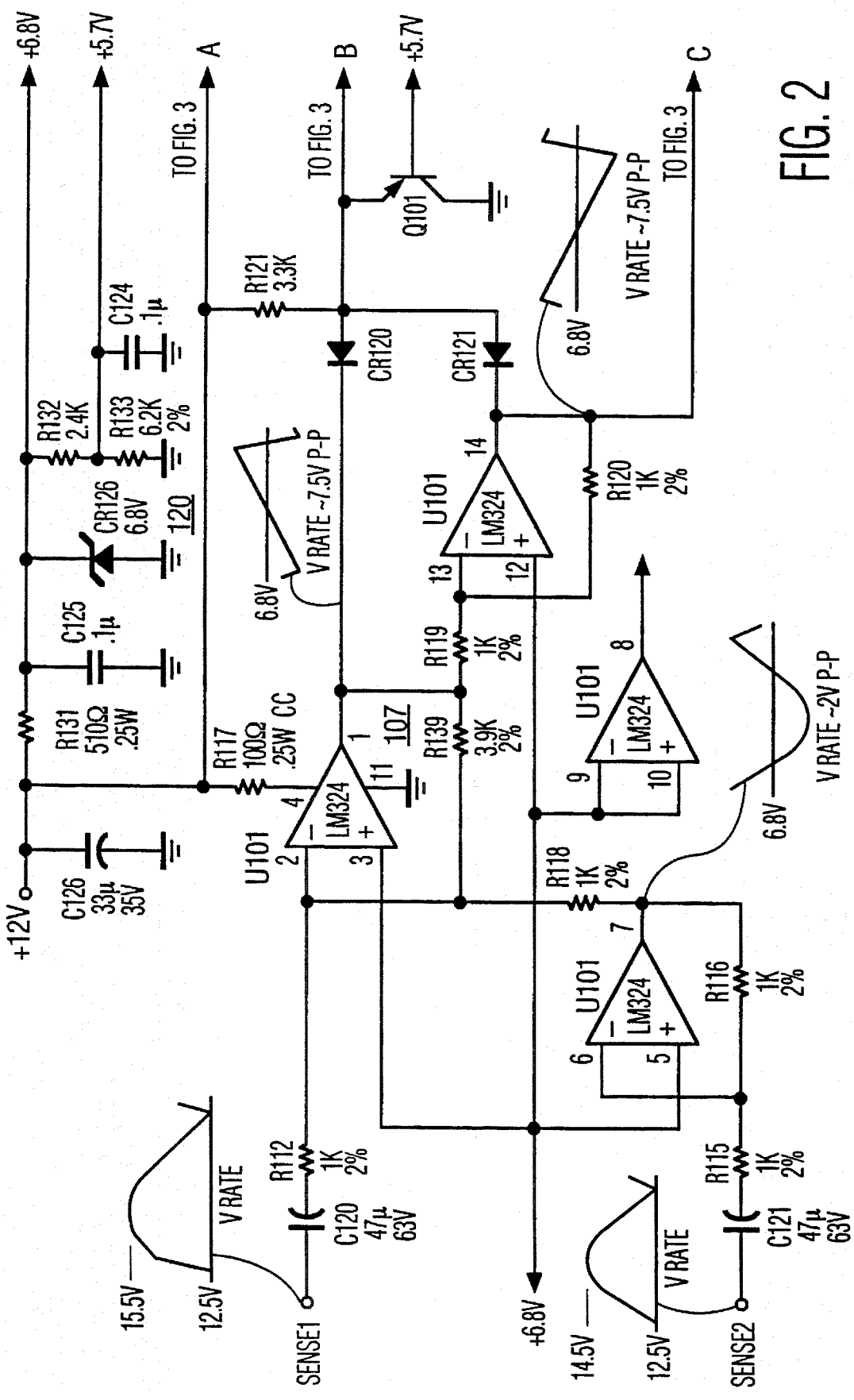
FIGS. 2 and 3, taken together, are a circuit schematic of a dynamic focus control circuit embodying the new protection circuit.
Figure 3:
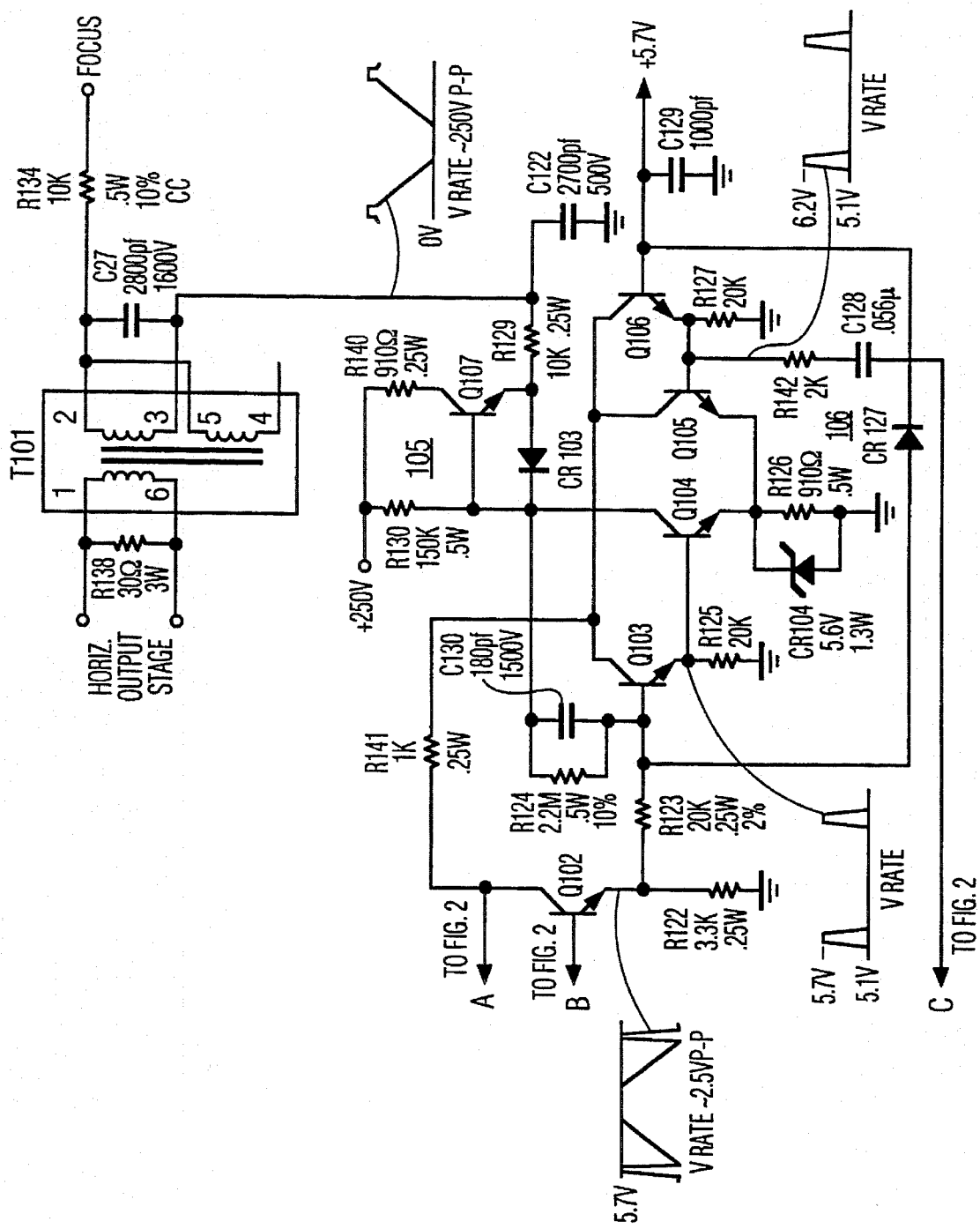

The undesirable part of this waveform can be eliminated according to an inventive arrangement. With further reference to FIGS. 2 and 3, taken together, there are two inputs SENSE1 and SENSE2 to a means 107 for generating a vertical rate sawtooth waveform. The SENSE1 and SENSE2 inputs carry signals from the two ends of a sampling resistor coupled in series with the vertical yoke, not shown. This sampling resistor is in series with an "S" correction capacitor, not shown. The SENSE2 signal is the voltage across the "S" capacitor and has vertical parabola added to a DC voltage. This "S" voltage changes with vertical waveform adjustments and drifts with temperature. Its influence on dynamic focus must be removed. This is done by inverting the AC component of SENSE2 and adding it to the AC component of SENSE1 as follows.

The voltage at SENSE1 is identical to that at SENSE2 except that a vertical saw proportional to the vertical yoke current is added. The DC is removed by capacitors C120 and C121 and a new DC level of +6.8 volts is inserted in each waveform. This is done so that the final output saw signals have a +6.8 volt value when SENSE1 is equal to SENSE2. This occurs when the current in the yoke is 0 volts. The unity gain inverted SENSE2 signal appears at pin 7 of quad operational amplifier U101. This is added to the SENSE1 signal and amplified by a factor of 3.9 to produce a vertical saw signal at operational amplifier pin 1 of U101. This pin 1 saw signal is then unity gain inverted and output at operational amplifier pin 14 of U101. The pin 1 and pin 14 saw signals are diode coupled via CR120 and CR121 respectively to the emitter of clamp transistor Q101. When either saw voltage is less than +6.2 volts it determines the voltage. The result is an inverted trapezoid with its maximum voltage clamped in the manner taught with respect to FIG. 1. This signal repeats during retrace.

It is desirable to remove the retrace waveform without using the conventional vertical blanking pulse that exists elsewhere in the television receiver, which would have added extra wiring. In order to achieve the equivalent of blanking, a vertical blanking pulse was made from the waveform at pin 14 of operational amplifier U101. This waveform is a vertical rate sawtooth with a negative slope during trace and a positive slope during vertical retrace. This waveform is coupled via capacitor C129 and R142 to the junction of the emitter of Q106 and the base of Q105. During trace, Q106 acts as an emitter follower and holds the voltage at its emitter 0.6 volts less than the +5.7 volt reference at its base. During trace, C128 is charged through resistor R142. Additionally, R142 provides isolation that prevents high frequency noise at operational amplifier pin 14 of U101 from affecting the emitter follower action of Q106 in a manner that would turn Q106 off by reverse bias of its emitter-base junction. This is important because the circuitry can pick up stray signals coupled from the horizontal power circuits that may be nearby in the television receiver.

During retrace, the amplitude of the positive going voltage change at operational amplifier pin 14 of U101 is much larger than the noise and is sufficient to turn off the emitter of Q106 and to increase the voltage at the base of Q105. This causes the current flowing through differential pair emitter resistor R126 to increase until Zener diode CR104 conducts. Due to feedback, the voltage at the bases of Q103 and Q104 also increases to maintain the current in Q104 such that the feedback loop (Q103, Q107 and R124) is balanced. When the voltage at the base of Q103 has risen 0.6 volts, diode CR127 turns on and clamps the rise in voltage at the base of Q103. The voltage at the emitter of Q106 continues to increase, increasing the voltage at the emitter Q104. Transistor Q103, now clamped at its base, acts as an emitter follower and holds the base voltage of Q104 constant. Q104 then turns off. The voltage at the collector of Q104 then approaches the +250 volt supply. This condition continues during the vertical retrace. The voltage at the collector of Q104 then approaches the +250 volt supply. This condition continues during the vertical retrace. In other words, transistor Q106 is operable in an emitter follower mode during vertical trace, during which capacitor C128 is charged in a first direction by the sawtooth waveform. The capacitor C128 is charged in an opposite direction during vertical retrace, which turns transistor Q106 off and turns transistor Q105 on.

The undesired negative going waveform normally at the collector of Q104 during vertical retrace is removed and replaced with a small positive going pulse. Due to the clamping action of Zener diode CR104, a large current could flow in Q105 which saturates during retrace. This current is limited by resistor R141. CR104 is not necessary to make this circuit work and R141 is not needed if the Zener diode is not used.

In a dynamic focus circuit for a CRT system having electrostatic focus, such as that shown in FIGS. 2 and 3, it is necessary to apply to the focus electrode about 800 volts p—p parabolic correction at a horizontal rate and about 200 volts p—p parabolic correction at a vertical rate. The horizontal rate correction is typically developed across the secondary of a step up transformer terminated in a capacitor. The vertical rate correction is added in series with the horizontal correction, typically by means of an amplifier that operates, for example, from a +250 volt power supply. In order to achieve a symmetrical response with minimum bias power a class A B amplifier can be used that employs a low impedance pull-up to charge the load capacitor. This type of push pull amplifier is subject to catastrophic failure if both devices turn on at the same time, such that a direct short occurs between the +250 volt supply and ground.

The problem can be addressed by providing an R-C decoupling stage between the amplifier and the +250 volt source, such that there is minimum DC voltage drop during normal operation and a large protecting drop during a failure. The short term transients are bypassed via the filter capacitor. In the present design it would have been necessary to use a high voltage filter capacitor, for example 0.33 µf rated at 300 volts, which is large and expensive. The series resistor of the R-C filter also causes a problem. The series resistor introduces a voltage loss in normal operation on the order of 20 volts, that limits the swing of the amplifier output. An inventive arrangement allows the amplifier to operate with an output voltage swing almost equal to the supply voltage. When a fault is present, the sensitive low voltage devices are protected with a voltage limiting Zener diode until a fusing resistor opens.

With reference to FIG. 3 in particular, an output stage and protection circuit 106 represents an improved version of the amplifier 104 and pull-up arrangement 105 shown in FIG. 1. The amplifier is differential, with a class A B output, and works as follows. Voltage drive developed across R122 is applied at the junction of R123 and R122 and causes a current in R123. Shunt feedback current flows via C130 and R124. The amplifier output voltage obtains a value that cancels the drive current so that a low frequency gain of about 2.2M/20K=110 is established. Transistors Q103 and Q104 form a Darlington pair and transistors Q106 and Q105 form a second Darlington pair. These two Darlington pairs are connected differentially. This arrangement minimizes temperature drift and provides a large input impedance, such that operation like an operational amplifier is possible.

The drive circuit is designed, as explained in connection with circuits 104 and 105 of FIG. 1, such that the maximum value of the drive signal is equal to the bias voltage at the opposing differential input. This allows the output to be near 0 volts when the drive is maximum. Problems arise when both Q107 and Q104 are conductive at the same time. This is not possible under normal operating conditions, but may become possible if one or both devices are shorted externally or fail and become shorted internally. If simultaneous conduction occurs, R140 may have a current as high as 0.25 A and dissipate about 60 W. This will cause R140 to burn open and break the circuit. Resistor R140 can be mounted above a printed circuit board on its leads so that it can burn open without charring the printed board. The Zener diode CR104 limits the voltage from the emitter of Q104 to ground, so that the low voltage transistors Q103, Q105 and Q106 are not damaged by excessive voltage or current. Zener diode CR104 may be chosen so that it only conducts during vertical retrace blanking. The resistor is sacrificed to save the transistors, which simplifies repair and service by preventing potential damage to the rest of the amplifier circuit.

If CR104 were not present, as is the case in FIG. 1, the current through R125 could cause a voltage as high as 125 volts. This would cause reverse breakdown and possible damage of the other three low voltage transistors.

The bias supply voltages of +6.8 volts and +5.6 volts are provided by a power supply stage 120, which receives a +12 volt input. Power supply stage 120 is regulated by a Zener diode CR126 rated at +6.8 volts, and includes capacitors C126, C125 and C124 and resistors R131, R132 and R133. Resistors R132 and R133 form a divider for setting the +5.6 volts off of the Zener regulated +6.8 volts.

What is claimed is:

1. An apparatus, comprising:
    means for generating a dynamic focus modulating signal for an electrode of a cathode ray tube;
    an active pull up arrangement generating an operating voltage;
    a voltage supply return;
    an amplifier for said modulating signal, coupled to said generating means and having a plurality of transistors coupled in a push pull configuration between said pull up arrangement and said supply return and biased by said operating voltage, said transistors being subject to damage in the event of a fault condition in said push pull configuration;
    at least one of said transistors being coupled in series between an element of said pull up arrangement and said supply return; and,
    switch means coupled between said at least one transistor and said supply return for switching current flow therebetween as a function of a voltage threshold value, said switch means having a voltage threshold value below the level at which said transistors will be damaged by said fault condition.

2. The apparatus of claim 1, wherein said fault condition is a short circuit path through said pull up arrangement and said at least one transistor, between a voltage supply for said pull up arrangement and said supply return.

3. The apparatus of claim 2, wherein said voltage threshold value is below the reverse breakdown levels of said transistors.

4. The apparatus of claim 1, wherein said transistors are low voltage Darlington pairs coupled in a differential configuration.

5. The apparatus of claim 4, wherein said low voltage transistors are subject to reverse breakdown in the event of said fault condition.

6. The apparatus of claim 1, wherein said switch means comprises a diode.

7. The apparatus of claim 1, wherein said switch means comprises a Zener diode.

8. The apparatus of claim 1, wherein said supply return is ground.

9. The apparatus of claim 1, wherein said element of said pull up arrangement comprises a fusible resistor, said switch means preventing said damage to said transistors until destruction of said fusible resistor terminates said fault condition.

10. The apparatus of claim 2, wherein said element of said pull up arrangement comprises a fusible resistor, said switch means preventing said damage to said transistors until destruction of said fusible resistor opens said short circuit path.

11. An amplifier, comprising:
    an active pull up arrangement, including a load resistor, coupled to a voltage source and generating an operating voltage;
    a voltage supply return;
    Darlington pairs coupled in a differential push pull configuration between said operating voltage and said supply return, at least one of said Darlington pairs having a device coupled in series with said pull up arrangement; and,
    switch means coupled between said device and said supply return for switching current flow therebetween as a function of a voltage threshold value, said switch means having a voltage threshold value below the reverse breakdown levels of said Darlington pairs.

12. The amplifier of claim 11, wherein said switch means prevents reverse breakdown of said Darlington pairs in the event of a short circuit path through said load resistor and said device, until destruction of said resistor opens said short circuit path.

13. The amplifier of claim 12, wherein said resistor is a fusible resistor.

14. The amplifier of claim 11, wherein said switch means comprises a diode.

15. The amplifier of claim 11, wherein said switch means comprises a Zener diode.

16. The amplifier of claim 11, in combination with means for generating a dynamic focus modulating signal and a deflection system for a cathode ray tube.

17. The amplifier of claim 9, wherein said supply return is ground.

\* \* \* \* \*